United States Patent
Greenwood et al.

(10) Patent No.: US 9,650,535 B2
(45) Date of Patent: May 16, 2017

(54) PAINT DISPERSION

(71) Applicant: Akzo Nobel Chemicals International B.V., Amersfoort (NL)

(72) Inventors: Peter Harry Johan Greenwood, Göteborg (SE); Hans Lagnemo, Göteborg (SE)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 0 days.

(21) Appl. No.: 14/397,424

(22) PCT Filed: May 6, 2013

(86) PCT No.: PCT/EP2013/059325
§ 371 (c)(1),
(2) Date: Oct. 27, 2014

(87) PCT Pub. No.: WO2013/167501
PCT Pub. Date: Nov. 14, 2013

(65) Prior Publication Data
US 2015/0141558 A1    May 21, 2015

Related U.S. Application Data

(60) Provisional application No. 61/644,539, filed on May 9, 2012.

(30) Foreign Application Priority Data

May 9, 2012   (EP) .................................... 12167299

(51) Int. Cl.
| C09D 133/08 | (2006.01) |
| C09D 5/02 | (2006.01) |
| C09D 7/12 | (2006.01) |
| C09D 133/04 | (2006.01) |
| C09D 133/00 | (2006.01) |
| C08K 9/04 | (2006.01) |

(52) U.S. Cl.
CPC .............. *C09D 133/08* (2013.01); *C08K 9/04* (2013.01); *C09D 5/028* (2013.01); *C09D 7/1225* (2013.01); *C09D 133/00* (2013.01); *C09D 133/04* (2013.01); *C08L 2201/54* (2013.01)

(58) Field of Classification Search
CPC ........... C09D 133/08; C08K 3/36; C08K 9/04
See application file for complete search history.

(56) References Cited

U.S. PATENT DOCUMENTS

| 2,630,410 A | 3/1953 | Clapsadle et al. |
| 4,927,749 A | 5/1990 | Dorn |
| 5,368,833 A | 11/1994 | Johansson et al. |
| 2004/0097600 A1* | 5/2004 | Greenwood ........... B82Y 30/00 516/86 |
| 2007/0106008 A1* | 5/2007 | Onoue ................... C09D 5/024 524/493 |
| 2009/0286673 A1 | 11/2009 | Omoshiki et al. |

FOREIGN PATENT DOCUMENTS

| EP | 1953195 A1 | 8/2008 |
| WO | 2004/035474 A1 | 4/2004 |

OTHER PUBLICATIONS

European Search Report for EP 12167299.2 dated Sep. 13, 2012.
International Search Report and Written Opinion for PCT Application No. PCT/EP2013/059325 date of mailing Jun. 14, 2013.
R.K. Iler et al, Degree of Hydration of Particles of Colloidal Silica in Aqueous Solution, Journal Phys. Chem 60 (1956); 955-957.
Salamanca et al., "Lateral Drying in Thick Films of Waterborne Colloidal Particles," *Langmuir* 2001, 17, 3202-3207.

* cited by examiner

*Primary Examiner* — Kuo-Liang Peng
(74) *Attorney, Agent, or Firm* — McDonnell Boehnen Hulbert & Berghoff LLP

(57) ABSTRACT

The invention relates to a method of providing an aqueous paint dispersion comprising silanized colloidal silica particles and an acrylate-based binder wherein the weight ratio of $SiO_2$ to acrylate-based binder on a dry basis ranges from 0.02 to 0.2, and wherein the content of $SiO_2$, measured by XRF, in said dispersion ranges from 1.05 to 7.5 wt %, wherein silane groups present in the silanized colloidal silica particles are derived from silanes containing an epoxy group, glycidoxy group, glycidoxypropyl group, ureido-based silanes, methacrylamido silanes, mercapto silanes, and combinations thereof. The invention also relates to the use thereof.

14 Claims, No Drawings

PAINT DISPERSION

This application is a national stage filing under 35 U.S.C. §371 of PCT/EP2013/059325, filed May 6, 2013, which claims priority to European Patent Application No. 12167299.2, filed May 9, 2012, and U.S. Provisional Patent Application No. 61/644,539, filed on May 9, 2012, the contents of which are incorporated herein by reference in their entirety.

The present invention relates to an aqueous paint dispersion comprising silanized colloidal silica particles and an acrylate-based binder, a method of preparing such dispersion, and the use thereof.

BACKGROUND OF THE INVENTION

Film formation of a water-based paint dispersion occurs from the coalescence of polymer particles. During water evaporation, the polymer particles approach each other, are deformed and polymeric macromolecular chains forming polymeric particles interdiffuse to form ideally continuous dry films. The different steps of the coalescence process are mostly governed by surface tension. The film formation—coalescence of the particles—occurs only if the capillary forces (proportional to the surface tension of the dispersion medium) are higher than the deformation forces (related to the mechanical properties of the polymer) and progress laterally (exterior to interior) and vertically (top to bottom). This particular progression mode promotes the formation of a thin skin of dry polymer on the top of the paint. This thin skin is the origin of the defects appearing during paint application. An increase of the open time of water-based paints could be induced by lowering the surface tension during the coalescence or by other phenomenon slowing down the film formation process.

Paint compositions imparting increased open time are known in the art, for example fluorosurfactant-containing compositions lowering the surface tension. As the fluorine-based surfactants lower the surface tension considerably, foaming and other problems occur such as problems with coalescence and hence film formation.

It would be desirable to provide a dispersion which extends the open time such that paints more conveniently can be applied, in particular in the absence of any other occurring problems such as surface tension decrease and/or foaming problems. The open time is the time available during which the paint can be reworked at a previously painted area. Open time is a key performance property for coatings, particularly for brush applications. Decorative paints can thereby be applied more conveniently and flexibly. Also, it would be desirable to provide a stable paint dispersion. In particular, it would be desirable to provide dispersions which can be easily stored and transported without precipitation or gellation. It would also be desirable to provide a convenient and inexpensive method of producing such a dispersion. An object of the present invention is to provide such a dispersion which simultaneously minimises the environmental impact, for example avoidance of solventborne paints. In addition, it is desirable to maintain or shorten the drying time of the paint after application on a substrate.

THE INVENTION

The invention relates to a method of preparing an aqueous paint dispersion comprising mixing silanized colloidal silica particles and an acrylate-based binder wherein the weight ratio of $SiO_2$ to acrylate-based binder on a dry basis ranges from 0.02 to 0.2, and wherein silanized colloidal silica particles are mixed in such amount that the content of $SiO_2$, measured by XRF, in said dispersion ranges from 1.05 to 7.5 wt %, wherein silane groups present in the silanized colloidal silica particles are derived from silanes containing an epoxy group, a glycidoxy group, a glycidoxypropyl group; ureido-based silanes, methacrylamido silanes, mercapto silanes, and combinations thereof.

The $SiO_2$ content is measured by XRF (X-ray fluorescence), preferably with a Philips Magix PW2424 spectrometer. Preferably, the method for measuring the silica content of the present invention is as follows: sample preparation was done by fusing the sample with $Li_2B_4O_7$ to a glass bead. If the carbon content is high, the sample is heated in air before fusion. Reference samples were prepared by using certified standards in the same way. Quantification of $SiO_2$ using XRF was performed by radiating the sample with gamma radiation generated by a Rh-tube and then measuring the amount of fluorescence radiation emitted by the sample by a Philips Magix DW2424 Spectrometer. The best sample preparation to reduce the spread is fusing the sample to a glass bead using for example $Li_2B_4O_7$. The amount of fluorescence is measured by using a calibration built on 16 different certified standards from, among others, British Chemical Standards (BCS) and National Bureau of Standards (NBS). The measurement of $SiO_2$ content of the silanized colloidal silica particles is preferably made before addition of any further components. By the term "dispersion" is also meant to include components present which are emulsified, for example acrylic emulsion resins, which may be emulsified by means of an emulsifying agent.

Preferably, additional components as described below are added to the forming dispersion. The amounts given regarding the components are based on the weight content of the finally obtained paint dispersion. The final paint dispersion thus contains such weight contents of the respective components.

Preferably, a dispersant/wetting agent is added in an amount ranging from 0.05 to 2, most preferably from 0.1 to 1.0 wt % based on the paint dispersion. Suitable dispersants include polysiloxanes.

Preferably a coalescing agent/plasticizer is added in an amount ranging from 0.5 to 5, more preferably from 1 to 3 wt % based on the paint dispersion. Glycol and glycol ethers can be used, preferably glycol ethers.

Preferably, a defoamer is added in an amount ranging from 0.05 to 1, most preferably from 0.1 to 0.3 wt % based on the paint dispersion. Suitable defoamers include polysiloxanes.

Preferably, a pigment is added in an amount ranging from 5 to 40, most preferably from 10 to 25 wt % based on the paint dispersion. Suitable pigments include inorganic pigments like titania, iron oxides (red, yellow, brown and black), zinc oxide, chrome pigment, ultramarine pigments, cobalt pigments (cobalt blue) and organic pigments like e.g. azo pigments.

Preferably, a filler such as crystalline silica, clay (aluminium silicates) or calcium carbonate can be added in an amount ranging from 5 to 40, most preferably from 10 to 25 wt % based on the paint dispersion.

Preferably, a thickener is added in an amount ranging from 0.1 to 3, most preferably from 0.3 to 1.5 wt % based on the paint dispersion. Suitable thickeners include polyurethane and EHEC and HEC cellulose-based thickeners.

Preferably, a dispersant is added in an amount ranging from 0.1 to 3, most preferably from 0.3 to 1 wt % based on the dispersion. Suitable dispersants include anionic surfactants.

Preferably, a rheology modifier for flow and levelling properties is added in an amount ranging from 0.1 to 3, most preferably from 0.3 to 1 wt % based on the dispersion. Suitable rheology modifiers include nonionic surfactants such as Surfynol 104 (2,4,7,9-Tetramethyl-5-decyne-4,7-diol).

Preferably, a biocide is added in an amount ranging from 10 to 500 ppm, most preferably from 20 to 200 ppm (as 100% biocide) based on the dispersion. The components making up the paint dispersion are suitably mixed at room temperatures, but heat can be generated during milling/dispersing of pigments in the millbase. Preferably, a millbase is firstly prepared whereupon a letdown is added thereto. Typically, in a millbase, dispersant, defoamer, pigment, and thickener are added. To a letdown added to the millbase, a coalescing agent, a thickener, a rheology modifier, defoamer and a biocide are usually added in addition to a binder.

Silanized colloidal silica particles can be obtained by any means as described in the prior art, for example in WO2004/035474. Mixing of silane and colloidal silica particles is preferably carried out continuously, preferably at a temperature from about 20 to about 95, more preferably from about 50 to about 75, and most preferably from about 60 to about 70° C. Preferably, silane is slowly added to the silica particles under vigorous agitation at a temperature of about 60° C. and at a controlled rate, which suitably is from about 0.01 to about 100, preferably from about 0.1 to about 10, more preferably from about 0.5 to about 5, and most preferably from about 1 to about 2 silane molecules per $nm^2$ colloidal silica surface area (on the colloidal silica particles) and hour. The addition of silane can be continued for any suitable time depending on the addition rate, amount of silane to be added, and degree of desired silanisation. However, the addition of silane is preferably continued for up to 5 hours, more preferably up to 2 hours until a suitable amount of silane has been added. The amount in weight of added silane to the colloidal silica particles suitably is from about 0.1 to about 6, preferably from about 0.3 to about 3, and most preferably from about 1 to about 2 silane molecules per $nm^2$ surface area of the colloidal silica particles. Continuous addition of silane to the colloidal particles may be particularly important when preparing highly concentrated silanized silica sols having a silica content up to about 80 wt %. However, the silica content suitably is from about 20 to about 80, preferably from about 25 to about 70, and most preferably from about 30 to about 60 wt %. Preferably, the silanized colloidal silica particles have a dry content of 15 to 60, most preferably from 25 to 50 wt % based on the dispersion.

Preferably, colloidal silica particles and silane are mixed to result in silanized colloidal silica particles having a weight ratio of silane to silica from about 0.01 to about 1.5, more preferably from about 0.05 to about 1, or from about 0.10 to about 0.5, and most preferably from 0.15 to 0.30.

Preferably, the silane compound is diluted before mixing it with the colloidal silica particles, preferably with water to form a premix of silane and water, suitably in a weight ratio of from about 1:8 to about 8:1, preferably from about 3:1 to about 1:3, and most preferably from about 1.5:1 to about 1:1.5. The resulting silane-water solution is substantially clear and stable and easy to mix with the colloidal silica particles. At continuous addition of silane to the colloidal silica particles, the mixing preferably continues from about 1 second to about 30 minutes, preferably from about 1 minute to about 10 minutes after the addition of silane has stopped. The mixing may be carried out at a pH from about 1 to about 13, preferably from about 6 to about 12, more preferably from about 7.5 to about 11, and most preferably from about 9 to about 10.5. In order to provide the claimed content of $SiO_2$ of the paint dispersion, a necessary amount of water can be added to dilute the content of the silanized colloidal silica particles. An aqueous paint dispersion can thereby be obtained. Preferably, a stable dispersion is prepared. By the term "stable" is meant in the context of a "stable dispersion" that the dispersion does not gel within a period of at least one year at a temperature from 15 to 25° C.

Preferably, the relative increase in viscosity of the dispersion one year after the preparation thereof is lower than 20% at a storage at a temperature of 15 to 25° C.

Preferably, colloidal silica particles are prepared by polymerization of polysilicic acid originating from water glass, precipitated silica, micro silica (silica fume), pyrogenic silica (fumed silica) or silica gels with sufficient purity, and mixtures thereof, most preferably waterglass.

Colloidal silica particles according to the invention may be modified and can contain other elements such as amines, aluminium and/or boron, which can be present in the particles and/or the continuous phase. Boron-modified silica sols are described in e.g. U.S. Pat. No. 2,630,410. The aluminium modified silica particles suitably have an $Al_2O_3$ content of from about 0.05 to about 3 wt %, preferably from about 0.1 to about 2 wt %. The procedure of preparing an aluminium modified silica sol is further described in e.g. "The Chemistry of Silica", by Iler, K. Ralph, pages 407-409, John Wiley & Sons (1979) and in U.S. Pat. No. 5,368,833.

The colloidal silica particles of the silanized silica particles suitably have an average particle diameter ranging from 2 to 150 nm, preferably from 3 to 50 nm, more preferably from 5 to 40 nm, most preferably from about 7 to about 12 nm. Suitably, the colloidal silica particles have a specific surface area from about 20 to about 1500, preferably from about 50 to about 900, and more preferably from about 70 to about 600 $m^2/g$ and most preferably from about 200 to about 400 $m^2/g$.

The colloidal silica particles preferably have a narrow particle size distribution, i.e. a low relative standard deviation of the particle size. The relative standard deviation of the particle size distribution is the ratio of the standard deviation of the particle size distribution to the mean particle size by numbers. The relative standard deviation of the particle size distribution preferably is lower than about 60% by numbers, more preferably lower than about 30% by numbers, and most preferably lower than about 15% by numbers.

The silanized colloidal silica particles are preferably dispersed in an aqueous phase, preferably in the presence of stabilising cations such as $K^+$, $Na^+$, $Li^+$, $NH_4^+$, organic cations, primary, secondary, tertiary, and quaternary amines, or mixtures thereof so as to form an aqueous silica sol. Preferably, the colloidal silica particles are negatively charged. Suitably, the silica content in the non-modified sol is from about 20 to about 80, preferably from about 25 to about 70, and most preferably from about 30 to about 60 wt %. The higher the silica content, the more concentrated the resulting silanized colloidal silica dispersion. The pH of the silica sol suitably is from about 1 to about 13, preferably from about 6 to about 12, and most preferably from about 7.5 to about 11. However, for aluminium-modified silica sols, the pH suitably is from about 1 to about 12, preferably from about 3.5 to about 11.

The silica sol preferably has an S-value from about 20 to about 100, more preferably from about 30 to about 90, and most preferably from about 60 to about 90.

It has been found that dispersions with an S-value within these ranges can improve the stability of the resulting dispersion. The S-value characterises the extent of aggregation of colloidal silica particles, i.e. the degree of aggregate or microgel formation. The S-value has been measured and calculated according to the formulas given in J. Phys. Chem. 60 (1956), 955-957 by Iler, R. K. & Dalton, R. L.

The S-value depends on the silica content, the viscosity, and the density of the colloidal silica particles. A high S-value indicates a low microgel content. The S-value represents the amount of $SiO_2$ in percent by weight present in the dispersed phase of e.g. a silica sol. The degree of microgel can be controlled during the production process as further described in e.g. U.S. Pat. No. 5,368,833.

Silane compounds can form stable covalent siloxane bonds (Si—O—Si) with the silanol groups or be linked to the silanol groups, e.g. by hydrogen bondings, on the surface of the colloidal silica particles. Thus, by this method, the silica particles are surface-modified.

Preferably, silane groups present in the silanized colloidal silica particles are derived from silanes containing an epoxy group, a glycidoxy group, a glycidoxypropyl group, and combinations thereof, most preferably silanes groups derived from silanes containing an epoxy group.

Preferably, silane groups present in the silanized colloidal silica particles are derived from silanes containing an epoxy group (epoxy silane), glycidoxy and/or a glycidoxypropyl group such as gamma-glycidoxypropyl trimethoxysilane, gamma-glycidoxypropyl methyldiethoxysilane, (3-glycidoxypropyl)trimethoxy silane, (3-glycidoxypropyl) hexyltrimethoxy silane, beta-(3,4-epoxycyclohexyl)-ethyltriethoxysilane. Preferably, silane groups present in the silanized colloidal silica particles are derived from uredo-based silanes such as gamma-ureidopropyltrimethoxy silanes, methacrylamido silanes, mercapto silanes such as 3-mercaptopropyltriethoxy silane and gamma-mercaptopropyl trimethoxysilane; tris-(trimethoxy)silane, methyl triethoxysilane, methyl trimethoxysilane; isocyanate silane such as tris-[3-(trimethoxysilyl)propyl]isocyanurate; bis-(3-[triethoxysilyl]propyl)polysulfide, beta-(3,4-epoxycyclohexyl)-ethyl trimethoxysilane; gamma-methacryloxypropyl trimethoxysilane, gamma-methacryloxypropyl triisopropoxysilane, gamma-methacryloxypropyl triethoxysilane, ethyltrimethoxy silane, propyltriethoxy silane, phenyltrimethoxy silane, cyclohexyltrimethoxy silane, cyclohexyltriethoxy silane, dimethyldimethyoxy silane, 3-chloropropyltriethoxy silane, 3-methacryoxypropyltrimethoxy silane, i-butyltriethoxy silane, trimethylethoxy silane, phenyldimethylethoxy silane, hexamethyldisiloxane, trimethylsilyl chloride, and mixtures thereof. U.S. Pat. No. 4,927,749 discloses further suitable silanes which may be used in the present invention.

Latex and/or water soluble resins and polymers of acrylate-based binders can be used. By the term "acrylate-based binders" is meant to include for example polyacrylic acids and polymethacrylic acids, as well as co-polymers of acrylate such as vinylicacrylic copolymers or styrene-acrylic polymers, acrylic and/or methacrylic copolymers of urethane.

Preferably, the dispersion of silanized colloidal silica particles is mixed with the acrylate-based binder in a weight ratio of $SiO_2$ to acrylate-based binder on a dry basis from 0.04 to 0.20, more preferably from 0.05 to 0.15, and most preferably from 0.08 to 0.11.

Preferably, the components are mixed at moderate temperature, suitably from about 15 to about 35° C., preferably from about 20 to about 30° C. Preferably, the components are mixed from about 10 seconds to about 1 hour, more preferably from about 1 minute to about 10 minutes. If necessary, the dispersion of silanized colloidal silica particles is diluted to adjust the silica content to a suitable level.

The invention also relates to an aqueous paint dispersion comprising silanized colloidal silica particles and an acrylate-based binder obtainable by the method.

The invention further concerns an aqueous paint dispersion comprising silanized colloidal silica particles and an acrylate-based binder wherein the weight ratio of $SiO_2$ to acrylate-based binder on a dry basis ranges from 0.02 to 0.2, and wherein the content of $SiO_2$, measured by XRF, in the paint dispersion ranges from 1.05 to 7.5 wt %, wherein silane groups present in the silanized colloidal silica particles are derived from silanes containing an epoxy group, a glycidoxy group, a glycidoxypropyl group; ureido-based silanes, methacrylamido silanes, mercapto silanes, and combinations thereof.

Preferably, the weight ratio of $SiO_2$ to acrylate-based binder on a dry base is in the range from 0.04 to 0.2, preferably from 0.05 to 0.15, and most preferably from 0.08 to 0.11.

Preferably, the paint dispersion has a $SiO_2$ content ranging from 1.3 to 7.5, more preferably from 1.3 to 4.5, and most preferably from 2.0 to 3.0 wt %.

The acrylate-based binder preferably is present in the form of a latex. Preferably, the total solid content of the aqueous paint dispersion comprising acrylate-based binder and silanized colloidal silica particles is from 35 to 80, preferably from 45 to 75, more preferably from 50 to 65 wt %, and most preferably from 51 to 55 wt %.

According to a preferred embodiment, the silanized colloidal silica particles and the acrylate-based binder are present as discrete particles in the dispersion. The dispersion preferably comprises further components in amounts as defined herein above. The dispersion may comprise further components as described herein above, typically in amounts as defined. The silanized colloidal silica particles and the acrylate-based binder may have properties as described in the method of preparing the claimed paint dispersion.

The stability of the dispersion facilitates the handling and application thereof in any use since it allows for storage and need not be prepared on site immediately before usage. The dispersion is beneficial in the sense that it does not involve hazardous amounts of toxic components.

The invention also relates to the use of the paint dispersion on any substrate, preferably a hard substrate, for example on bricks, tiles, minerals such as stone or sandstone, wood, metal surfaces such as steel or aluminium, plastics, ceramics, cementitious materials, glass, porcelain, most preferably wood. Soft surfaces such as textiles, fabrics, and paper are not comprised as suitable substrates for the paint dispersion according to the invention.

The invention being thus described, it will be obvious that the same may be varied in many ways. Such variations are not to be regarded as a departure from the gist and scope of the present invention, and all such modifications as would be obvious to one skilled in the art are intended to be included within the scope of the claims. While the examples here below provide more specific details of the reactions, the following general principles may here be disclosed. The following examples will further illustrate how the described invention may be performed without limiting the scope of it.

All parts and percentages refer to part and percent by weight, if not otherwise stated.

EXAMPLES

Paint Preparation

Aqueous paint formulations Ref.Paint and Paint A-H as set out in Table 1 were prepared at room temperature by first providing a mill base of components 1 to 7 which have been ground and dispersed by means of a high speed Kreis-dissolver (Niemann) type KDV 30-3.0 (2240 rpm for 30 minutes). Explanations of the components used can be found in table 2. A letdown comprising components 8 to 14 was subsequently added to the mill base after dispersing and moderate agitation at 1000 rpm for 15 minutes. As can be noted from table 1 below, Ref. Paint contains no silanized colloidal silica (Bindzil CC301) whereas the further paints A-H comprise Bindzil CC301 added to the letdown or the millbase (addition to mill base only for Paint B bis). Table 3 below shows characteristics of the prepared paint compositions.

TABLE 2

Description of components

| Component | Description/function of components |
| --- | --- |
| Millbase | |
| Disperbyk 190 | Dispersant and wetting agent |
| Envirogem AD01 | De-foamer |
| Acticide MBS | Biocide |
| Kronos 2310 | Titanium dioxide pigment of rutile type |
| Coapur XS 52 | Polyurethane thickener |
| Bindzil CC301 | Silane modified colloidal silica dispersion, silane modified silica content of 28%-wt $SiO_2$ (based on XRF measurement) |
| Letdown | |
| Primal HG 1000 | Acrylic resin, TS: 46% |
| Texanol | Coalescing agent |
| Coapur XS 52 | Polyurethane thickener |
| AquaFlow NHS 300 | Rheology modifier for flow and leveling properties |
| Acticide MBS | Biocide (5 wt-% active product; 2.5% MIT + 2.5% BIT) |
| Bindzil CC301 | Silane modified colloidal silica dispersion, silane modified silica content of 28%-wt $SiO_2$ (based on XRF measurement) |

TABLE 1

Paint formulations (amounts given in parts by weight)

| Component | Ref. Paint | Paint A | Paint B | Paint B bis | Paint C | Paint D | Paint E | Paint F | Paint G | Paint H |
| --- | --- | --- | --- | --- | --- | --- | --- | --- | --- | --- |
| Millbase | | | | | | | | | | |
| 1. Water | 5.34 | 5.34 | 5.34 | 5.34 | 5.34 | 5.34 | 5.34 | 5.34 | 5.34 | 5.34 |
| 2. Disperbyk 190 | 1.15 | 1.15 | 1.15 | 1.15 | 1.15 | 1.15 | 1.15 | 1.15 | 1.15 | 1.15 |
| 3. Envirogem AD01 | 0.35 | 0.35 | 0.35 | 0.35 | 0.35 | 0.35 | 0.35 | 0.35 | 0.35 | 0.35 |
| 4. Acticide MBS | 0.04 | 0.04 | 0.04 | 0.04 | 0.04 | 0.04 | 0.04 | 0.04 | 0.04 | 0.04 |
| 5. Kronos 2310 | 24.00 | 24.00 | 24.00 | 24.00 | 24.00 | 24.00 | 24.00 | 24.00 | 24.00 | 24.00 |
| 6. Coapur XS 52 | 0.66 | 0.66 | 0.66 | 0.66 | 0.66 | 0.66 | 0.66 | 0.66 | 0.66 | 0.66 |
| 7. Bindzil CC301 | 0.00 | 0.00 | 0.00 | 2.40 | 0.00 | 0.00 | 0.00 | 0.00 | 0.00 | 0.00 |
| Letdown | | | | | | | | | | |
| 8. Primal HG 1000 | 57.01 | 57.01 | 57.01 | 57.01 | 57.01 | 57.01 | 57.01 | 57.01 | 57.01 | 57.01 |
| 9. Texanol | 2.36 | 2.36 | 2.36 | 2.36 | 2.36 | 2.36 | 2.36 | 2.36 | 2.36 | 2.36 |
| 10. Coapur XS 52 | 0.44 | 0.44 | 0.44 | 0.44 | 0.44 | 0.44 | 0.44 | 0.44 | 0.44 | 0.44 |
| 11. Aquaflow NHS 300 | 1.44 | 1.44 | 1.44 | 1.44 | 1.44 | 1.44 | 1.44 | 1.44 | 1.44 | 1.44 |
| 12. Acticide MBS | 0.29 | 0.29 | 0.29 | 0.29 | 0.29 | 0.29 | 0.29 | 0.29 | 0.29 | 0.29 |
| 13. Water | 4.90 | 3.65 | 2.50 | 2.50 | 1.15 | 0.00 | 0.00 | 0.00 | 0.00 | 0.00 |
| 14. Bindzil CC301 | 0.00 | 1.25 | 2.40 | 0.00 | 3.75 | 5.00 | 7.5 | 10.00 | 12.5 | 15.00 |
| TOTAL | 97.97 | 97.97 | 97.97 | 97.97 | 97.97 | 98.07 | 100.57 | 103.07 | 105.57 | 108.07 |

TABLE 3

Characteristics of paint formulations of table 1 (percentages in wt %)

| Component | Ref. Paint | Paint A | Paint B | Paint B bis | Paint C | Paint D | Paint E | Paint F | Paint G | Paint H |
|---|---|---|---|---|---|---|---|---|---|---|
| Bindzil CC301 product (wt %) | 0 | 1.28 | 2.45 | 2.45 | 3.82 | 5.10 | 7.46 | 9.70 | 11.84 | 13.88 |
| $SiO_2$ content of silane modified colloidal silica in total formulation wt % | 0 | 0.36 | 0.69 | 0.69 | 1.07 | 1.43 | 2.09 | 2.72 | 3.32 | 3.89 |
| Amount dry silane modified silica, $SiO_2$, based on dry resin (wt %) | 0 | 1.3 | 2.6 | 2.6 | 4.0 | 5.3 | 8.0 | 10.7 | 13.3 | 16.0 |
| Dry content of resin pigment and silanized colloidal silica (wt %) | 51.3 | 51.6 | 52.0 | 52.0 | 52.3 | 52.6 | 52.0 | 51.4 | 50.9 | 50.4 |

As can be noted in table 4 below, a too high addition of silane modified colloidal silica (Bindzil CC 301) will not result in a prolonged open time but will lower the solid content of the paint which is not desirable. For example, addition of 20 weight parts of Bindzil CC301 (on a product basis) to the formulations as indicated in Table 1 will result in a solid content of 49.3 wt % which means an additional portion of water needs to evaporate. In addition, a high dosage of silane modified silica may be uneconomical from a cost perspective. The $SiO_2$ content was measured and quantified by XRF. The method for measuring the silica content of the present invention is as follows: sample preparation was done by fusing the sample with $Li_2B_4O_7$ to a glass bead. If the carbon content is high, the sample is heated in air before fusion. Reference samples were prepared by using certified standards in the same way. Quantification of $SiO_2$ using XRF was performed by radiating the sample with gamma radiation generated by a Rh-tube and then measuring the amount of fluorescence radiation emitted by the sample by a Philips Magix PW2424 Spectrometer. The best sample preparation to reduce the spread is fusing the sample to a glass bead using for example $Li_2B_4O_7$. The amount of fluorescence is measured by using a calibration built on 16 different certified standards from, among others, British Chemical Standards (BCS) and National Bureau of Standards (NBS).

This method of measuring the open time covers a procedure to determine the length of time a paint remains "wet" or "open" enough to allow for brush-in and repair. The method involves reworking of the paint surface by means of a brush as paint is being loaded (10 brush strikes backward and forward) over time intervals (interval=1 minute) until this is no longer possible. From Table 4 it can be noted that the addition point of silane-modified silica to the mill base and the letdown does not appear to be of any importance (cf. Paint B and Paint B bis). A significant enhancement in view of open time is achieved for paints C-H both when it comes to i) open time during which period of time the paint can be reworked without any visible defects and ii) open time until paint had clear well visible defects.

The invention claimed is:

1. Aqueous paint dispersion comprising silanized colloidal silica particles, an acrylate-based binder, and polysiloxane;
   wherein the weight ratio of $SiO_2$ to acrylate-based binder on a dry basis ranges from 0.02 to 0.2;
   wherein the content of $SiO_2$, measured by XRF, in said dispersion ranges from 1.05 to 7.5 wt %;
   wherein silane groups present in the silanized colloidal silica particles are derived from silanes containing an epoxy group, glycidoxy group, glycidoxypropyl group,

TABLE 4

ASTM D7488 - Test method for open time of latex (wet open time)

Elapsed Time (minutes) before paint surface reworking

| | Open Time without surface defects (minutes) | Open Time without surface defects, relative increase in % | Open Time with well visible surface defects (minutes) | Open Time with well visible surface defects, relative increase in % |
|---|---|---|---|---|
| Ref. Paint | 4 | — | 6 | — |
| Paint A | 5 | 25% | 6 | 0% |
| Paint B | 6 | 50% | 7 | 17% |
| Paint B bis | 5 | 25% | 7 | 17% |
| Paint C | 6 | 50% | 8 | 33% |
| Paint D | 8 | 100% | 9 | 50% |
| Paint E | 9 | 125% | 10 | 67% |
| Paint F | 9 | 125% | 10 | 67% |
| Paint G | 9 | 125% | 11 | 83% |
| Paint H | 9 | 125% | 11 | 83% | ureido-based silanes, methacrylamido silanes, mercapto silanes, and combinations thereof;

wherein the polysiloxane is present in an amount of 0.05 to 2 wt %; and wherein the colloidal silica particles are prepared by polymerization of polysilicic acid originating from water glass.

2. The dispersion of claim 1 wherein the dispersion remains stable for at least 12 months at a temperature from 15 to 25° C.

3. The dispersion of claim 1, wherein the $SiO_2$ content in the dispersion ranges from 1.3 to 5 wt %.

4. The dispersion of claim 3, wherein the $SiO_2$ content in the dispersion ranges from 1.3 to 4.5 wt %.

5. The dispersion of claim 4, wherein the $SiO_2$ content in the dispersion ranges from 2 to 3 wt %.

6. The dispersion of claim 1, wherein the total dry content in the dispersion ranges from 45 to 75 wt %.

7. The dispersion of claim 1, wherein the silane group of the silanized colloidal silica particles is derived from an epoxy silane.

8. The dispersion of claim 6, wherein the total dry content in the dispersion ranges from 50 to 65 wt %.

9. The dispersion of claim 1, wherein the content of $SiO_2$ is measured by XRF using a Philips Magix PW2424 spectrometer.

10. A method for painting of bricks, minerals, wood, metal surfaces, plastics, ceramics, cementitious materials, glass, or porcelain comprising the step of applying the paint dispersion of claim 1 to bricks, minerals, wood, metal surfaces, plastics, ceramics, cementitious materials, glass, or porcelain.

11. Method of preparing an aqueous paint dispersion comprising mixing silanized colloidal silica particles, an acrylate-based binder and a polysiloxane;

wherein the weight ratio of $SiO_2$ to acrylate-based binder on a dry basis ranges from 0.02 to 0.2;

wherein silanized colloidal silica particles is mixed in such amount that the content of $SiO_2$, measured by XRF, in said dispersion ranges from 1.05 to 7.5 wt %;

wherein silane groups present in the silanized colloidal silica particles are derived from silanes containing an epoxy group, glycidoxy group, glycidoxypropyl group, ureido-based silanes, methacrylamido silanes, mercapto silanes, and combinations thereof;

wherein the polysiloxane is present in an amount of 0.05 to 2 wt %; and wherein the colloidal silica particles are prepared by polymerization of polysilicic acid originating from water glass.

12. The method of claim 11, wherein the $SiO_2$ content in the dispersion ranges from 1.3 to 5 wt %.

13. The method of claim 11, wherein the total dry content of the dispersion ranges from 45 to 75 wt %.

14. The method of claim 11, wherein the silane groups present in the silanized colloidal silica particles are derived from silanes containing an epoxy group.

* * * * *